United States Patent [19]
Irwin

[11] Patent Number: 6,095,181
[45] Date of Patent: Aug. 1, 2000

[54] ARTICULATED MACHINE OVERHITCH HOSE SUPPORT

[75] Inventor: George Irwin, Newcastle, United Kingdom

[73] Assignee: Caterpillar S.A.R.L., Geneva, Switzerland

[21] Appl. No.: 09/393,044

[22] Filed: Sep. 9, 1999

[51] Int. Cl.$^7$ ............................................. B65H 75/36
[52] U.S. Cl. ...................... 137/351; 137/355.17; 248/75; 138/106; 138/111
[58] Field of Search ............................ 137/351, 355.17; 248/75; 280/421; 180/51; 138/111, 106

[56] References Cited

U.S. PATENT DOCUMENTS

| | | | |
|---|---|---|---|
| 1,406,471 | 2/1922 | Merickel | 137/355.17 |
| 2,170,557 | 8/1939 | Guarnaschelli | 138/106 |
| 2,177,128 | 10/1939 | Johnson | 138/61 |
| 2,527,270 | 10/1950 | Levin | 138/111 |
| 2,578,280 | 12/1951 | Barnard | 138/111 |
| 2,619,888 | 12/1952 | Young et al. | 97/50 |
| 2,626,552 | 1/1953 | Oehler et al. | 97/50 |
| 2,673,093 | 3/1954 | Silver et al. | 280/421 |
| 2,853,262 | 9/1958 | Reimann | 248/75 |
| 2,861,817 | 10/1958 | Greeson | 280/421 |
| 2,996,315 | 8/1961 | Roth et al. | 285/2 |
| 3,722,916 | 3/1973 | Muntjanoff | 280/421 |
| 3,866,670 | 2/1975 | Cramer et al. | 165/47 |
| 3,872,881 | 3/1975 | Miller et al. | 137/355.17 |
| 3,882,886 | 5/1975 | Ely et al. | 137/344 |
| 3,885,816 | 5/1975 | Miller et al. | 280/421 |
| 3,901,270 | 8/1975 | Smith | 137/351 |
| 4,156,436 | 5/1979 | Hawk | 137/344 |
| 4,320,783 | 3/1982 | Neal et al. | 137/351 |
| 4,854,392 | 8/1989 | Frisbee | 172/813 |
| 5,027,478 | 7/1991 | Suhr | 24/16 R |
| 5,082,217 | 1/1992 | Parker et al. | 248/75 |

*Primary Examiner*—A. Michael Chambers
*Attorney, Agent, or Firm*—Hancock Estabrook, L.L.P.

[57] ABSTRACT

Hydraulic hoses coupled between the tractor and trailer units of an articulated vehicle are connected to each of the units by a swivel joint to permit the hydraulic hoses to swivel at the point of connection to the respective tractor and trailer units. The hydraulic hoses are individually positioned within separators to separate the hydraulic hoses and position them in a predetermined manner relative to forming a hose bundle. Each of the hydraulic hose supporting separators is positioned on a steel spring bow to control the shape of the hose bundle, with each end of the spring bow terminating in a coil spring at the point of connection with the tractor and trailer units. A support frame, preferably joined to the trailer unit, retains the hose bundle in a predetermined position to provide vertical stability and a spiral plastic or rubber outer wrap encircles the hose bundle to protect and keep the bundle together. In this manner, the hydraulic hoses are protected, and can accommodate the relative articulation and roll between the tractor and trailer units while the positioning of the bundles is controlled to eliminate or minimize any twisting action imposed thereon.

11 Claims, 5 Drawing Sheets

ARTICULATED MACHINE OVERHITCH HOSE SUPPORT

TECHNICAL FIELD

This invention relates to a support system for hydraulic hoses which are coupled between a tractor unit and a trailer unit of an articulated vehicle, such as used in earthmoving and construction operations and, more particularly, to an overhitch hydraulic hose support for controlling and protecting the hydraulic hoses coupled between an articulated tractor unit and trailer unit which can articulate to either side of the centerline between the two joined units and simultaneously roll relative to each other.

BACKGROUND ART

The transfer of hydraulic fluid between a tractor unit and a hitched trailer unit is achieved through the use of hydraulic hoses coupled between the units. The integrity of these hydraulic hoses is very important to the operation and function of the machine. In coupling the hydraulic fluid between the tractor unit and the trailer unit, such hydraulic hoses must be capable of accommodating the angular and pivotal movement which occurs between these units of the machine. Because of the differences in hydraulic line sizes, such hydraulic hoses can be up to 38 millimeters in diameter, and over 2 meters in length. One manner of accommodating the joinder of such hoses is to form a large upstanding loop with the hoses, carried between the tractor and trailer units. Accordingly, such hydraulic hoses passing between the units and over the hitch there between, must be supported and protected to ensure the integrity of the hydraulic fluid communicating between the two units.

If such hydraulic hoses are not adequately protected, they become susceptible to damage from contact with moving machine parts or being dragged against hot exhaust pipes. In addition, because of the nature of the hydraulic fluid passing through such hoses, as such fluid becomes heated the hoses become more pliable and more difficult to control requiring a structural support to keep them in a desired position. Furthermore, when an articulated machine rolls, a twist is induced into the hydraulic hoses decreasing their useful life. Accordingly, it is desirable that the hydraulic hoses be bundled, and that the hose bundle be supported and controlled to prevent damage to the hoses. In addition, it is highly desirable to eliminate or minimize any hose twisting caused by the relative articulation and/or rolling between the tractor and trailer units.

Various attempts have been made to provide a suitable system for controlling the position and/or movement of the hydraulic hoses coupled between relatively moveable components. For example, in U.S. Pat. Nos. 2,861,817; 3,279,822; 3,722,916; and 5,082,217 structures are disclosed wherein the support for the hydraulic hoses is effected by carefully threading the hoses over and through the structure of the machine itself, so that the hoses are in direct contact with the machine structure and constrained or held against structural machine components. None of these patents, however, appear to disclose any matter for protecting the hydraulic hoses or preventing the hoses from being twisted because of the relative movement between the coupled units.

Patents, such as U.S. Pat. Nos. 2,619,888; 2,626,552; 2,673,093; 2,996,315; 3,901,270; and 4,854,392, each disclose various structures which include mechanical linkage for suspending or supporting the hydraulic hoses by means of a hose support arrangement mounted on one of the articulated units to constrain or suspend the hoses in a fixed position from a point on the hydraulic hoses between the connections to the two units.

In U.S. Pat. Nos. 2,853,262; 3,872,881; 3,882,886; and 4,156,436 there are disclosed hydraulic support systems wherein the hydraulic hoses are clipped or strapped together to form a bundle, and the bundle so formed is supported by an arcuate member, band or wire rope secured at each end to one of the articulated units for supporting the bundled hoses. U.S. Pat. No. 2,177,128 discloses a hose support wherein the hose is substantially encased and supported by a plurality of metal links each one pivotally joined to another of the links.

This invention is directed to overcoming one or more of the problems or concerns set forth above.

DISCLOSURE OF THE INVENTION

In the preferred embodiment of this invention, the hydraulic hoses coupled between the tractor and trailer units of an articulated vehicle are connected to each of the units by a swivel joint to permit the hydraulic hoses to swivel at the point of connection to the respective tractor and trailer units. The hydraulic hoses are individually positioned within separators to separate the hydraulic hoses and position them in a predetermined manner relative to forming a hose bundle. Each of the hydraulic hose supporting separators is positioned on a steel spring bow to control the shape of the hose bundle, with each end of the spring bow terminating in a coil spring at the point of connection with the tractor and trailer units. A support frame, preferably joined to the trailer unit, retains the hose bundle in a predetermined position to provide vertical stability and a spiral plastic or rubber outer wrap encircles the hose bundle to protect and keep the bundle together. In this manner, the hydraulic hoses are protected, and can accommodate the relative articulation and roll between the tractor and trailer units while the positioning of the bundles is controlled to eliminate or minimize any twisting action imposed thereon.

Related methods and other features and other advantages of the present invention will be apparent from the following description and the accompanying drawings.

BEST MODE FOR CARRYING OUT THE INVENTION

Figure 1:
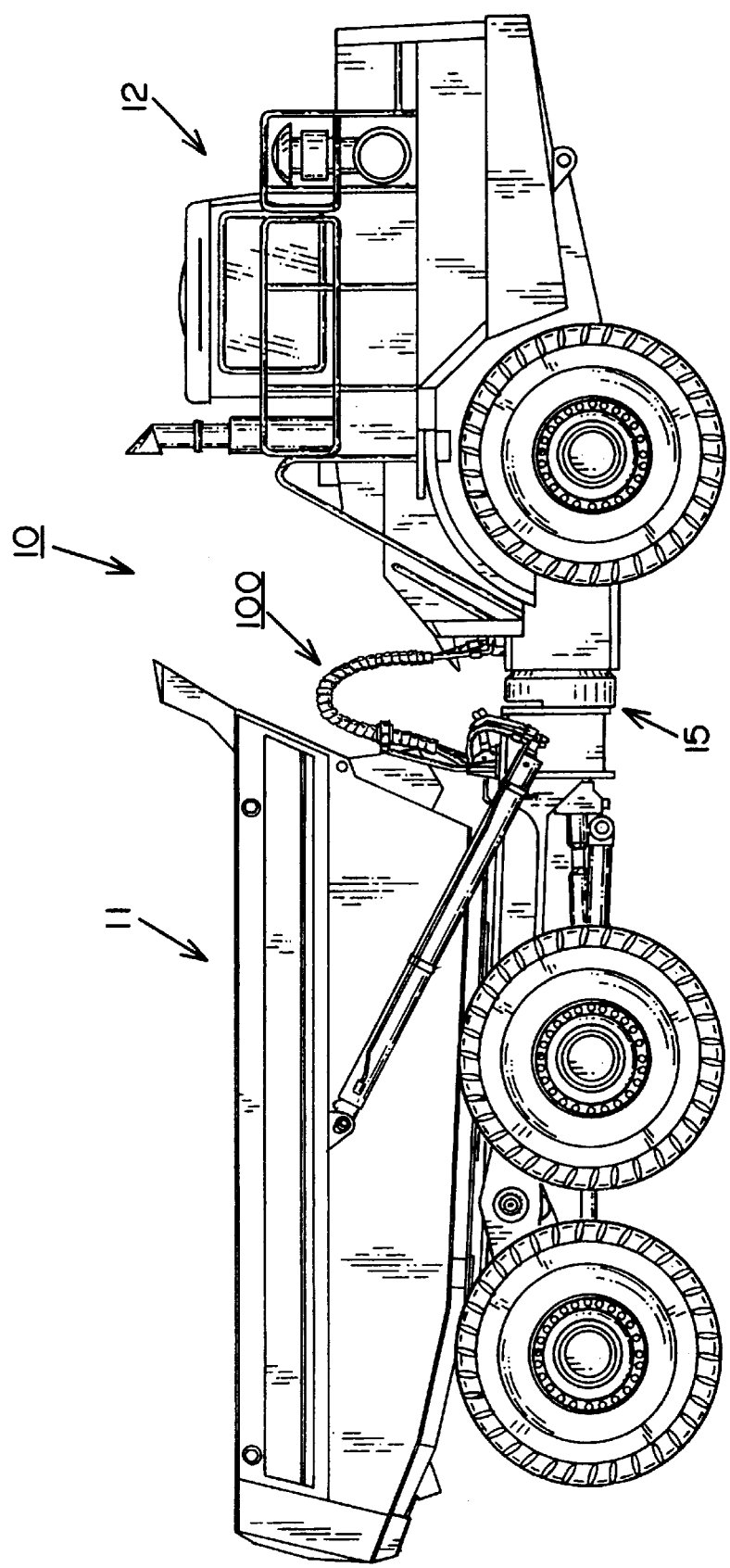
FIG. 1 is a side elevation view of an exemplary vehicle, an articulated off-highway truck, incorporating the present invention.

Referring now to FIG. 1, this invention is illustrated in use on a construction work machine, such as an articulated off-highway truck (10). It will be understood, however, that the use of this invention is equally applicable to any other articulated vehicle, as well as the off-highway truck (10) illustrated.

In general, the truck (10) includes a truck body or trailer portion (11) into which materials are loaded to be carried by the truck to another location whereat the materials are discharged, and a tractor portion (12) connected to the trailer portion (11) by a hitch (15) which permits the two portions of the truck to articulate and simultaneously roll relative to each other. A plurality of hydraulic hoses are connected between the tractor unit (12) and the trailer unit (11) and retained in a particular manner by means of an overhitch hose support (100) to be hereinafter described in detail.

Figure 2:
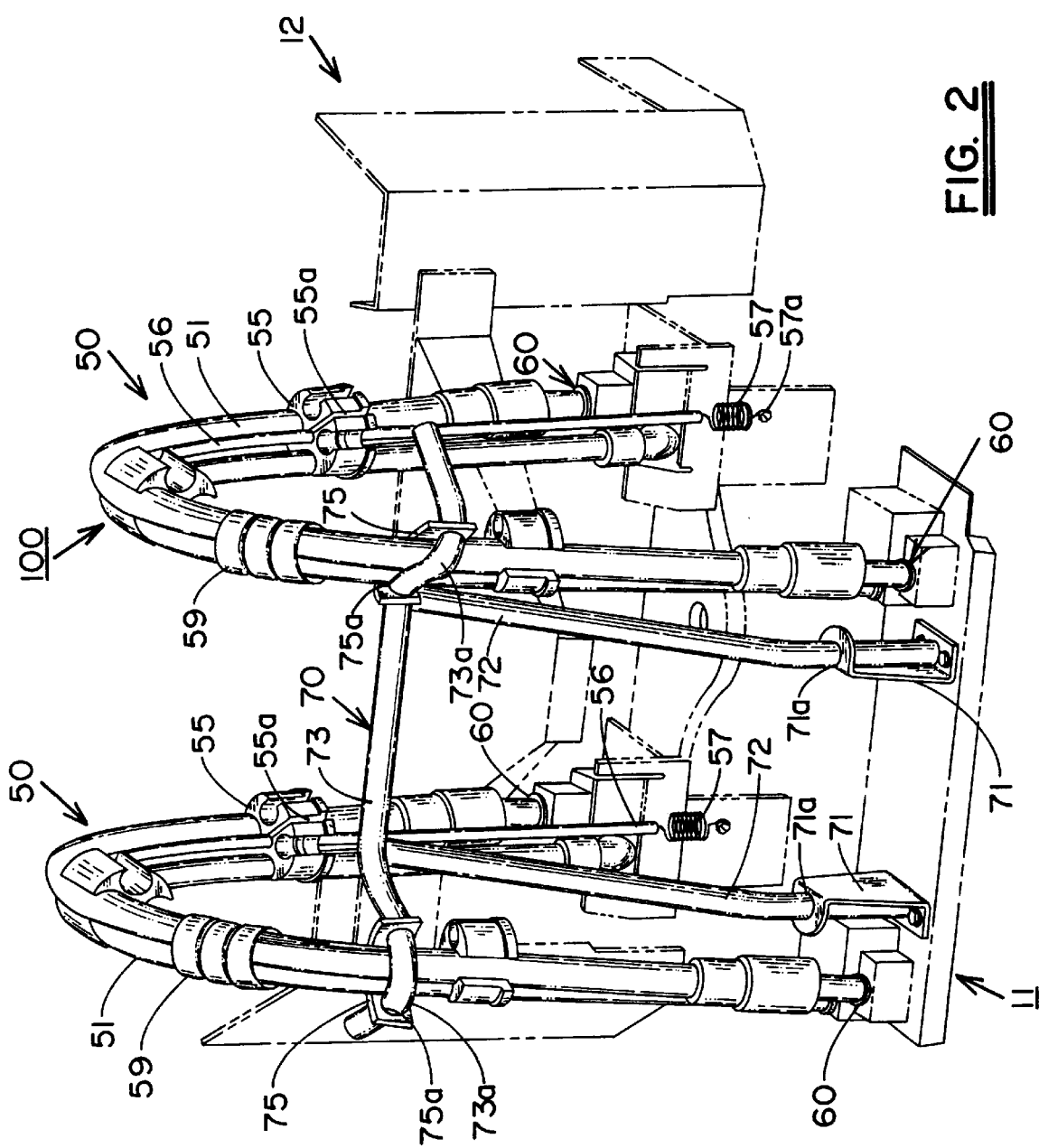
FIG. 2 is a partial perspective view of the front portion of the trailer unit and the rear portion of the tractor unit to better illustrate the manner in which the hose bundle is formed and protected.
Figure 3:
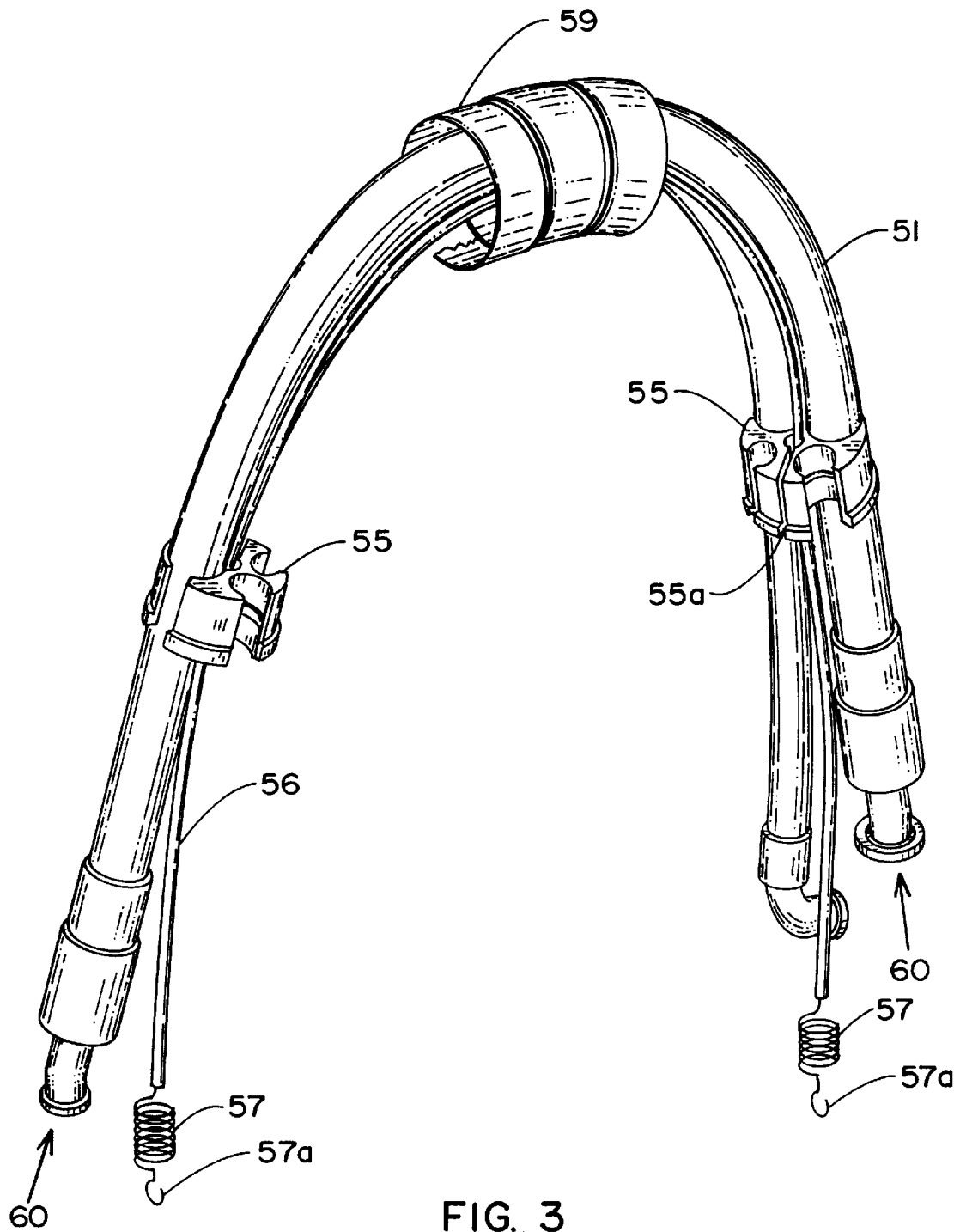
FIG. 3 is a partial perspective view of one of the hose bundles with portions removed to better illustrate the manner in which the bundle is supported.
Figure 4:
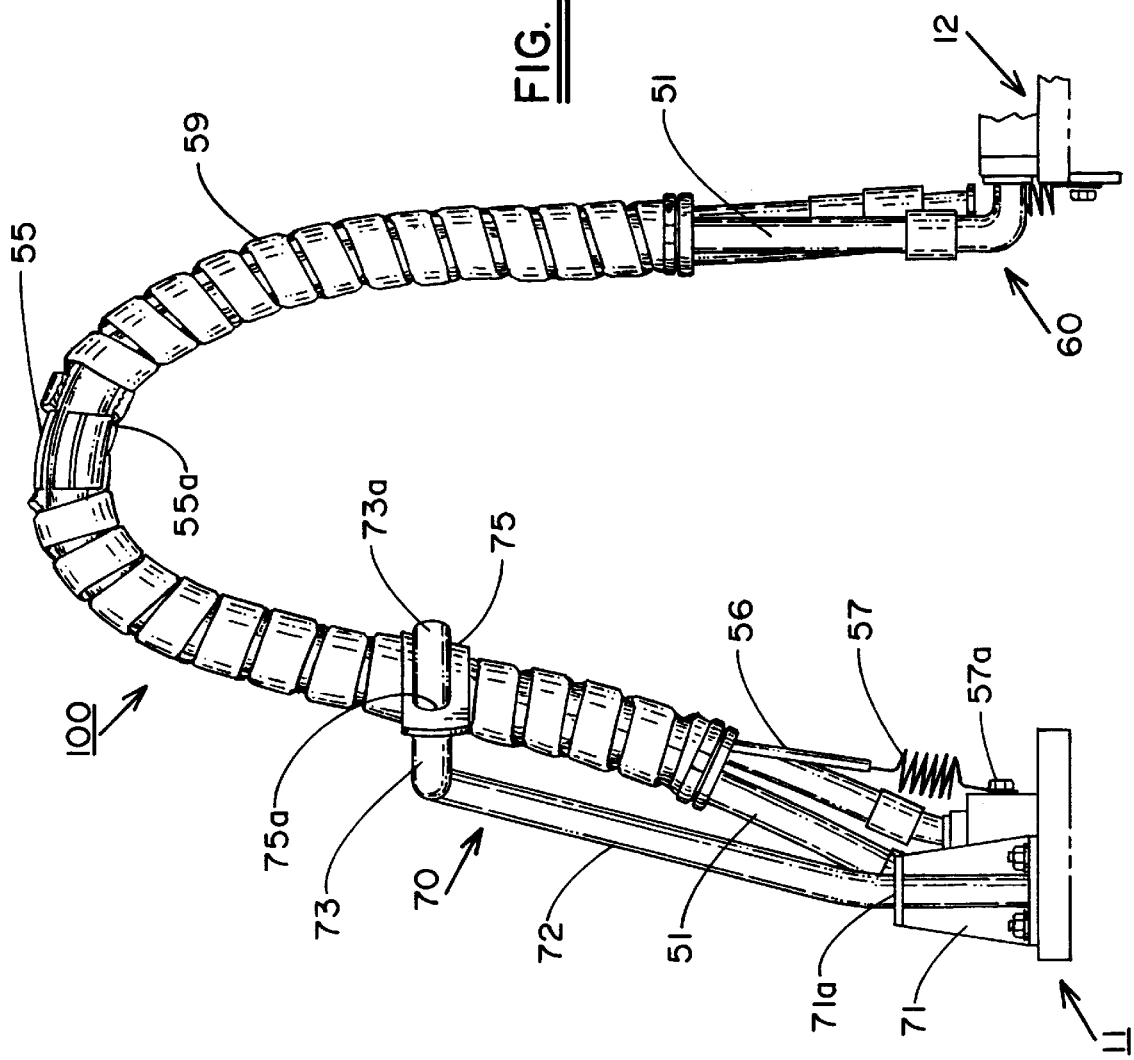
FIG. 4 is a partial elevation of the truck body illustrated in FIG. 1 to better illustrate the manner in which a hose bundle is supported by a support frame and spring bow, with portions removed to better illustrate the construction of the bundle.
Figure 5:
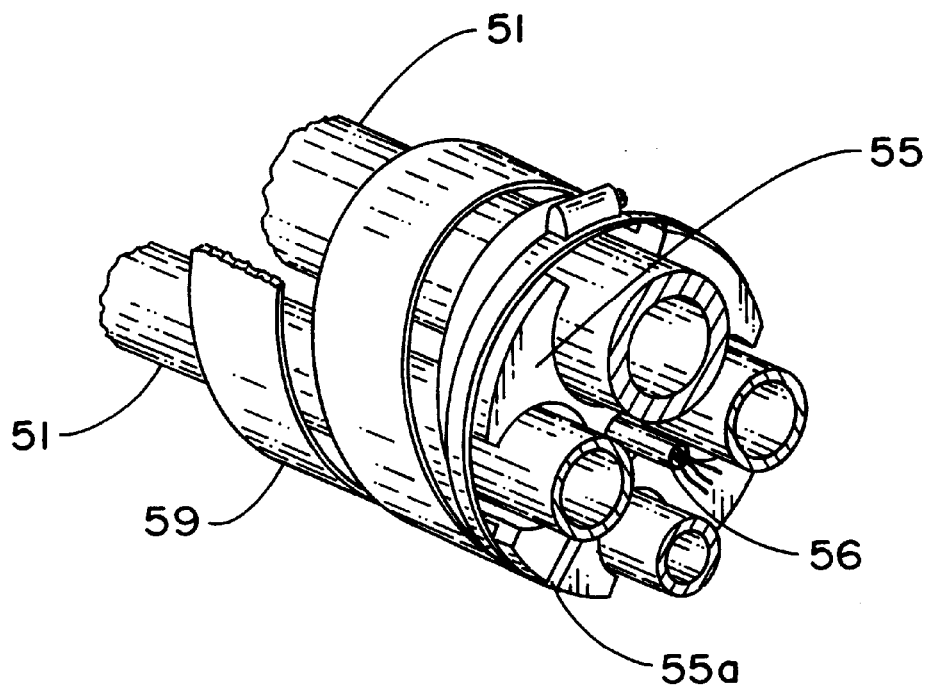
FIG. 5 is an enlarged perspective view of a portion of one of the hose bundles to better illustrate the spiral wrapping, connector and the manner in which the spring bow passes through the hose separator to support the hose bundle.

As is best illustrated in FIGS. 2–4, there is illustrated a pair of hydraulic hose bundles (50) for communicating hydraulic fluid between the tractor unit (12) and the trailer unit (11). While each of these hydraulic hose bundles (50) may group together a different number of hydraulic hoses (51), having different diameters, the manner in which such hydraulic hoses are bundled and the bundled hoses (50) supported and retained is the same for both bundles. Therefore, for convenience of illustration, only one of the bundles will be described in detail.

The hydraulic hoses extend between the tractor and trailer units to couple various hydraulically actuable structures in fluid communication to the controls and actuating mechanisms to effect their operation. In order to accommodate the relative movement between the tractor and trailer units, these hydraulic hoses are configured with a large loop to permit the relative movement of the vehicle portions without causing undue hose wear or damage. Therefore, it is necessary to control the positioning of these hose loops because of their close proximity to moving parts of the machine and the movement of the hose itself caused by the internal pressure changes therein.

Figure 6:
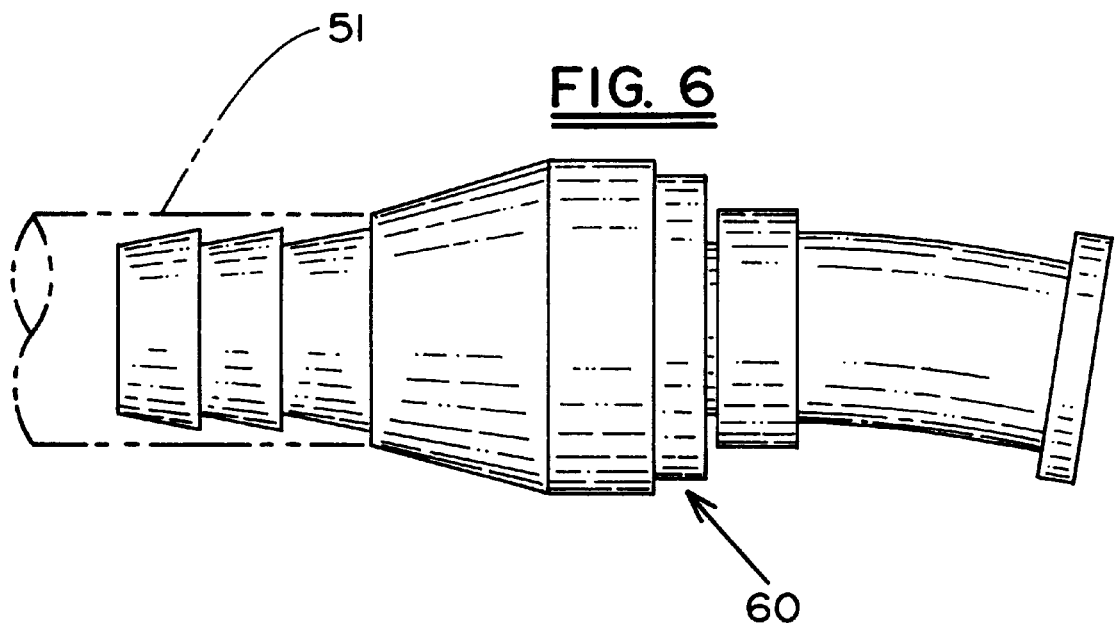
FIG. 6 is a section view of a typical connection between the end of a hydraulic hose and the tractor and trailer units to better illustrate swivel joint which permits the end of the hose to swivel relative to the tractor and trailer.

The terminal end of the hydraulic hoses (51) is connected to the tractor and trailer units by a pivotal hose fitting (60), a cross section of which is shown in FIG. 6. This fitting permits a hose (51) to swivel relative to the vehicle unit to which the hose is attached to minimize twisting of the hose. Such a suitable swivel joint is available from Hamer Stevenson Hydraulics, Ltd. Unit 3, Five Fold Industrial Park, Valley Drive, Oldham, England, under their Model No. FS 5900 Heavy Duty Full Flow Swivel Joint. Each of the individual hoses is positioned within one of a plurality of openings formed in a hose separator (55) which positions and retains each of the hoses (51) relative to others. In this manner, the hoses (51) are bundled together, but separated one from the other by the hose separator (55). Each of the separators (55) is mounted on a steel spring bow (56), which passes through a slot (55a) to be received in a central opening of the hose separator.

The steel spring bow (56) has a coil spring (57) at each of its terminal ends, and each spring is formed with an eyelet (57a) at the terminal end thereof for securing the spring bow (56) to the tractor (12) and trailer (11) units. The spring steel bow (56) controls the shape of the hose bundle (50) and the helical coils (57) at the terminal ends of the bow (56) permit the bow to flex and twist, but always return to its pre-formed inverted AU@ shape. In this manner relative movement between the tractor and trailer units may be accommodated without twisting the hydraulic hoses (51). A plastic or rubber sheath (59) is wound about the entire bundle (50) in a spiral manner, to provide additional protection and keep the hoses bundled together.

As best illustrated in FIG. 2, three separators (55) are used, and it is preferred that the uppermost separator (55) be fixed to the spring bow (56), and the two lower separators (55) be free to slide on the spring bow to best minimize any stress from being imposed on the hoses (51) because of the relative movement between the tractor and trailer units.

To retain the portion of the hydraulic hoses (51) coupled to the trailer unit (11) in a desired vertical position, a hose support frame (70) is mounted to the trailer unit (11) by brackets (71) which permit the terminal end of frame legs (72) to be inserted into and removed from the bracket (71) through an opening (71a) formed therein. The opposite or top end of the two legs (72) is joined by a horizontal bar (73). Each end of the bar (73) is formed with a curved portion (73a) for engaging and supporting a hose bundle (50).

An elastomeric strap (75) having a suitable opening (75a) in each end thereof is positioned on the horizontal bar (73) to retain the hose bundle in a desired position. The elastomeric strap (75) will permit the hose bundle (50) to move during machine operation, and then return to the preferred position thereby accommodating any movement of the hose bundle (50) imposed by the machine. If such relative movement by the machine occurs beyond the elastomeric limit of strap (75), the strap is readily replaceable.

INDUSTRIAL APPLICABILITY

In operation, the hose bundle (50) will be supported in a desired vertical position by means of the support bracket (70) of the trailer unit (11). The elastomeric bands (75) will hold the hose bundle (50) in the desired position away from moving machine parts and abrasion causing surfaces. In the event that the relative movement between the trailer unit (11) and the tractor unit (12) requires that the hose bundle (50) be moved from the desired position, the elastomeric straps (75) of the frame (70) will accommodate such movement, and return the hose bundle (50) to the desired position. In the event the required movement of the hose bundle (50) exceeds the elastomeric limits of the straps (75), the straps are readily replaceable.

The shape of the hose bundle (50) is controlled by the spring steel bow (56) which has helical coils (57) at each end. The helical coils (57) reduce the incidence of fatigue of the spring bow (56) in accommodating the relative movement between the tractor and trailer units, allowing the spring bow (56) to flex and twist as necessary, but always returning to its pre-formed shape.

The hose separators (55), supported on the spring bow (56), separate the hydraulic hoses (51) and the plastic or elastomeric material (59) wrapped about the hoses (51) and separators (55) to form the hose bundle (50). The addition of a swivel joint (60) at the connection between the hydraulic hose (51) and the tractor (12) and trailer (11) units permits the hydraulic hoses (51) to accommodate the articulation and roll between the vehicle units with a minimum of induced stresses, returning the hose bundles (50) to the pre-determined position to keep them from contacting moving machine parts or portions of the vehicle which might cause the hydraulic hoses to be damaged.

While this invention is described and shown for use with an articulated off-highway truck, it is to be understood that the invention could be adapted to function just as well with other vehicles utilizing an articulated coupling for permitting relative movement between portions of the vehicle. This invention has been described in the specification and illustrated in the drawings with reference to a preferred embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention shall include all embodiments, modifications and changes as may come within the scope of the following claims:

What is claimed is:

1. A support system for controlling the position and movement of a flexible connector connected at a first end to a first member and at a second end to a second member, said first and second members moveable relative to each other, comprising:

a flexible connector having a first end and a second end;

a first member connected to said first end of said flexible connector;

a second member connected to said second end of said flexible connector;

a spring bow supporting said flexible connector and having a first end and a second end;

said first end of said spring bow connected to said first member and said second end of said spring bow connected to said second member; and said first and second ends of said spring bow each including a spring forming the connection to said respective first and second members.

2. The support system of claim 1 further including at least one flexible connector separator carried by said spring bow for bundling a plurality of flexible connectors thereto.

3. The support system of claim 2 wherein said flexible connector comprises a plurality of hydraulic hoses.

4. The support system of claim 3 further including a protective covering encircling said plurality of hydraulic hoses, said spring bow and said flexible connector separator.

5. The support system of claim 4 wherein at least one of said hydraulic hoses is connected to at least one of said first and second members by a swivel coupling.

6. The support system of claim 4 including three flexible connector separators, an uppermost flexible connector secured to said spring bow and two flexible connector separators carried by said spring bow and moveable relative thereto.

7. The support system of claim 1 wherein each of said springs is formed with a terminal portion for joining said spring bow to said first and second members.

8. The support system of claim 1 further including a support frame carried by one of said first and second members in a position to engage said flexible connector and said spring bow for retaining said flexible connector and said spring bow in a predetermined position.

9. A support system for controlling the position and movement of a plurality of flexible hydraulic hoses connected at one end to a tractor unit and connected at another end to a trailer unit, comprising:

a plurality of hydraulic hoses, each of said hydraulic hoses connected at a first end to a tractor unit and connected at a second end to a trailer unit;

at least one of said plurality of hydraulic hoses having a swivel connection at one of the ends thereof for coupling to one of said tractor or trailer units;

a spring bow for supporting said plurality of hydraulic hoses, said spring bow having at least one spring at one end thereof connecting said spring bow to one of said tractor or trailer units;

a plurality of hydraulic hose separators carried by said spring bow and supporting said plurality of hydraulic hoses forming a hydraulic hose bundle; and a protective covering positioned about said hydraulic hose bundle.

10. The support system of claim 9 further including a support frame carried by one of said tractor or trailer units and positioned to engage said hydraulic hose bundle for supporting said hydraulic hose bundle in a predetermined position.

11. The support system of claim 10 wherein said support frame including releasable elastomeric fasteners for engaging said hydraulic hose bundle and securing said hydraulic hose bundle to said support frame.

* * * * *